(12) United States Patent
Rudolph et al.

(10) Patent No.: US 9,390,259 B2
(45) Date of Patent: Jul. 12, 2016

(54) METHOD FOR ACTIVATING AN OPERATING SYSTEM IN A SECURITY MODULE

(71) Applicant: GIESECKE & DEVRIENT GMBH, Munich (DE)

(72) Inventors: Jens Rudolph, Munich (DE); Martin Rosner, Haag in Oberbayern (DE)

(73) Assignee: GIESECKE & DEVRIENT GMBH, Munich (DE)

( * ) Notice: Subject to any disclaimer, the term of this patent is extended or adjusted under 35 U.S.C. 154(b) by 0 days.

(21) Appl. No.: 14/420,001

(22) PCT Filed: Jul. 19, 2013

(86) PCT No.: PCT/EP2013/002152
§ 371 (c)(1),
(2) Date: Feb. 6, 2015

(87) PCT Pub. No.: WO2014/023394
PCT Pub. Date: Feb. 13, 2014

(65) Prior Publication Data
US 2015/0220729 A1    Aug. 6, 2015

(30) Foreign Application Priority Data
Aug. 7, 2012   (DE) .................. 10 2012 015 573

(51) Int. Cl.
*G06F 21/00*     (2013.01)
*H04L 29/06*     (2006.01)
(Continued)

(52) U.S. Cl.
CPC  *G06F 21/53* (2013.01); *G06F 8/67* (2013.01); *G06F 21/54* (2013.01); *G06F 2221/0735* (2013.01)

(58) Field of Classification Search
CPC ........... G06F 21/53; G06F 21/54; G06F 8/67; G06F 2221/0735
See application file for complete search history.

(56) References Cited

U.S. PATENT DOCUMENTS 6,154,878 A   11/2000  Saboff
6,212,576 B1   4/2001  King
(Continued)

FOREIGN PATENT DOCUMENTS

DE        10336568 A1    2/2005
DE     102007003580 A1    7/2008

OTHER PUBLICATIONS

Selimis, George et al., "Software and Hardware Issues in Smart Card Technology", IEEE Communications Surveys & Tutorials, vol. 11, No. 3, Third Quarter 2009, p. 143-152.
(Continued)

*Primary Examiner* — Lisa Lewis
(74) *Attorney, Agent, or Firm* — Workman Nydegger

(57) ABSTRACT

A method for activating an operating system in a security module, wherein the security module is operational either by means of a first operating system or by means of a second operating system. The method comprises the steps of: operating the security module by means of the first operating system and shifting the security module from the first operating system to the second operating system. A primary application incorporated in the security module accesses the respective operating system by means of an operating-system interface. The above concept are incorporated in a security module and employment of a security module in an end device.

9 Claims, 3 Drawing Sheets

(51) Int. Cl.
*G06F 21/53* (2013.01)
*G06F 9/445* (2006.01)
*G06F 21/54* (2013.01)

(56) References Cited

U.S. PATENT DOCUMENTS

| | | | |
|---|---|---|---|
| 6,996,828 B1 | 2/2006 | Kimura et al. | |
| 7,011,252 B2 | 3/2006 | Ohya et al. | |
| 2006/0123403 A1* | 6/2006 | Bruecklmayr | G06F 9/4426 717/136 |
| 2009/0319793 A1* | 12/2009 | Zic | G06F 21/34 713/172 |
| 2010/0012732 A1 | 1/2010 | Pinzinger et al. | |
| 2012/0110274 A1 | 5/2012 | Rosales et al. | |
| 2013/0247133 A1* | 9/2013 | Price | G06F 21/577 726/1 |
| 2014/0196124 A1* | 7/2014 | Wang | G06F 17/00 726/5 |
| 2015/0281957 A1* | 10/2015 | Hartel | H04M 1/675 455/411 |

OTHER PUBLICATIONS

International Search Report from PCT Application No. PCT/EP2013/002152, Sep. 30, 2013.
German Search Report from DE Application No. 10 2012 015 573.5, Apr. 18, 2013.
International Preliminary Report on Patentability from PCT Application No. PCT/EP2013/002152, Feb. 10, 2015.

* cited by examiner

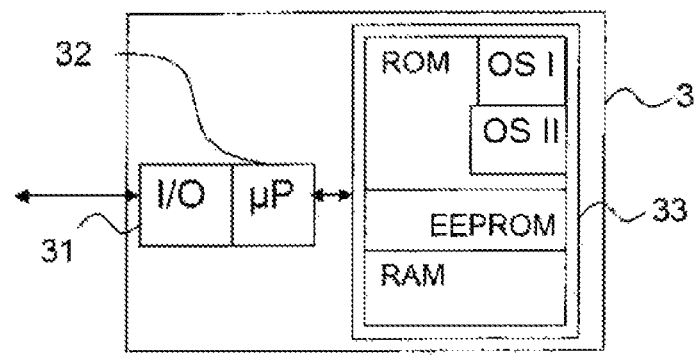
Fig. 1 – Prior Art
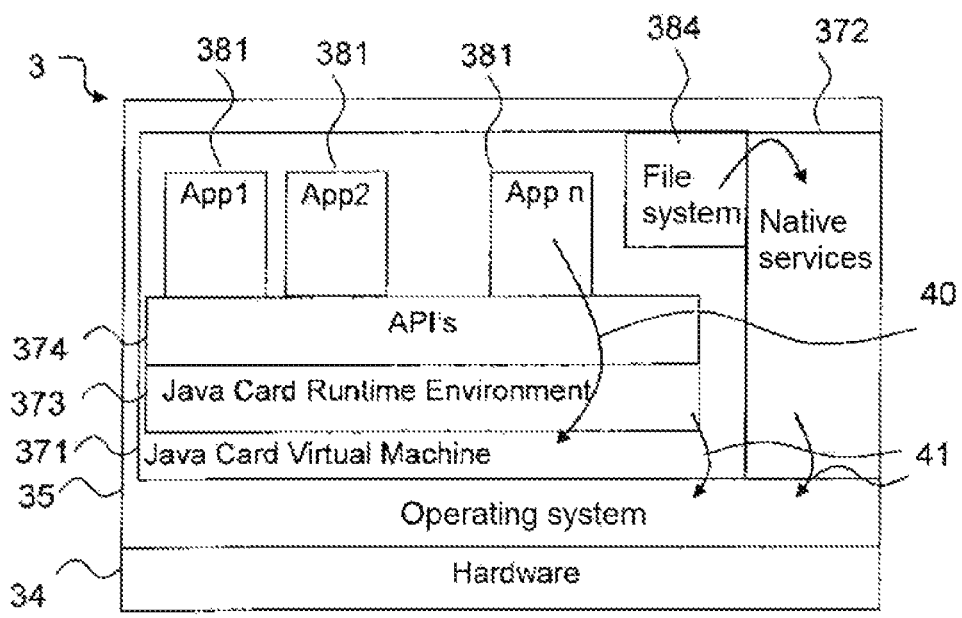
Fig. 2

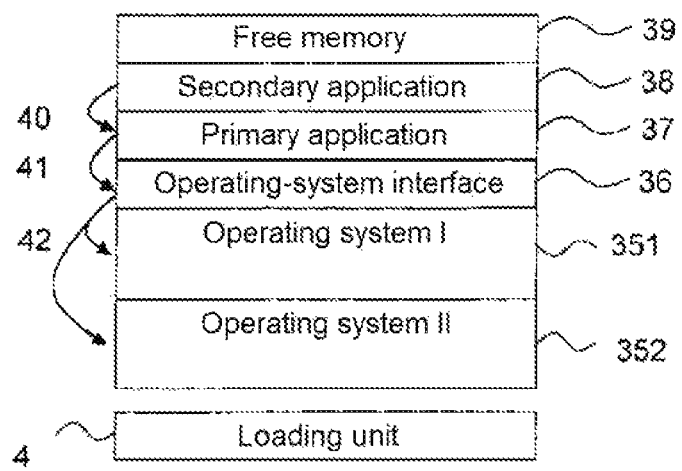

METHOD FOR ACTIVATING AN OPERATING SYSTEM IN A SECURITY MODULE

BACKGROUND

The invention relates to a method for activating an operating system in a security module, to a security module as well as to the employment of a security module in an end device.

Security modules have system resources, in particular data interfaces for data input and/or data output, one or several central processing units CPU, coprocessors, volatile memory areas as working memory and non-volatile memory areas in particular EEPROM, ROM and/or FLASH. On the security module there are executed applications which while executed access the system resources of the security module. This access of the applications to the system resources is managed by an operating system of the security module. The operating system of the security module thus forms an interface between the system resources and the applications on the security module which are to be respectively executed.

If errors in the operating system are discovered or if it is established that a certain functionality is not contained in the operating system, for example a function, a method or a program code library, then missing or corrected operating system code parts, so-called patches, can be reloaded. For this purpose, jump-in addresses are defined, at which—instead of the erroneous/missing operating system code—the patch is executed. A return to the starting point of an application is then possible by means of defined return addresses in the patch.

In the DE 10 2007 003 580 A1 there is described the patching of a portable data carrier, wherein the patch is reloaded in the form of an executable application code into the data carrier and executed, which makes possible an installation of operating system parts during the operation of the portable data carrier.

This patching is elaborate and only leads to the correction or extension of small parts of the operating system. Therefore, from time to time a new version of the operating system is created. Security modules that are already in operation are then either exchanged or the update of the operating system is dispensed with.

It is desirable that the operating system in a security module is always kept updated to the latest development state. In this way, additional functions, restructurings in the operating system code, and improved performance of the security module can be achieved. In particular the errors discovered in the older version of the operating system in the past are corrected. As such an operating system update is extensive, this is not possible with the mentioned patching without considerable processing power losses of the security module.

From the DE 10 336 568 A1 it is known to implement an emergency operating system in a chip card, so that upon the occurrence of a major error during the operation of the chip card with the normal operating system there is ensured at least a minimum functionality of the chip card. But here many functions are not offered in the emergency operating system, so that the user of the chip card is severely restricted and endeavours to exchange the chip card as fast as possible.

From the U.S. Pat. No. 7,011,252 B1 it is known to incorporate two operating systems in the permanent non-volatile memory area (ROM) of a chip card. With the aid of the employed data interface there is employed either the one or the other operating system for executing an application. The operating systems here, likewise, are not updatable, i.e. errors in one of the operating systems also have to be corrected by means of patches.

SUMMARY

The invention is based on the object of allowing the operating system of a security module to be replaced. In doing so, the security module is to be operational at any time, in particular deleting the old operating system shall not be possible before a newer/other operating system is activated, to allow user code and data in the security module to be accessed at any time. In particular, the security module is already in use at the time of the replacement. In particular, the replacement is to be made possible in an uncomplicated fashion and without effort, so that the user code already incorporated in the security module or the already incorporated data do not have to be adapted or adjusted to the newer operating system.

The object is achieved with a method according to the invention for activating an operating system in a security module, the security module being operational either by means of a first operating system or by means of a second operating system. Here, the security module is operated by means of the first operating system. Subsequently, there is effected a shift or switchover of the security module from the first operating system to the second operating system, i.e. the security module is no longer operated with the first operating system, but with the second operating system. According to the invention, a primary application incorporated in the security module accesses the respective operating system by means of an operating-system interface, so that the incorporated primary application can remain unchanged by the step of shifting.

A security module for the purposes of the invention is a module with a reduced overall size and resource range, which has a central processing unit, at least one data interface for the communication with an end device, and a memory area. This memory area is such that data are securely incorporated, which is why attempted manipulation and/or abuse for the purpose of stealing the data from the security module are fruitless. The data in the security module serve, for example, for the identification and/or authentication of a user at a terminal, an end device, or a network.

The security module is for example a chip card, also Universal Integrated Circuit card (UICC) or SIM card, an electronic identity document (eID, ePass), an electronic driver's license, electronic car registration certificate, or a payment card, such as credit or debit card.

The security module is in particular a subscriber identity module for authenticating/identifying a subscriber in a mobile radio network, with machine-readable subscriber identity data of the subscriber stored on a chip. Such subscriber identity modules are operated in an end device by means of card reading units and can in principle be removed from the end device in order either to be exchanged by other subscriber identity modules or to be operated in a different end device.

Alternatively, the security module is an integral part within an end device, for example of a firmly wired electronic modular component. Such security modules are also referred to as embedded UICC (eUICC) or embedded secure elements (eSE). In this design, these security modules are not provided for a removal from the end device and in principle cannot be readily exchanged.

Alternatively, the security module is a machine-to-machine, M2M for short, module. These modules serve for the remote monitoring, control and maintenance of end devices as well as of machines, plants and systems. They can alternatively also be employed for counting units such as current meters, hot water meters, so-called smart meters.

Alternatively, the security module is configured as a software component in a trustworthy part of an operating system, a so-called trusted execution environment (TEE) of the end device. The security module is then configured for example within a secured runtime environment in the form of programs running therein, so-called trustlets.

According to the invention, a primary application does not access the operating system directly. Instead, the primary application accesses the operating system by means of an operating-system interface incorporated in the security module. Operating-system interface is also understood to mean the shifting of the linkings to system resources from the first operating system to the second operating system. The step of shifting by shifting the linking is carried out and/or managed by the operating-system interface.

The operating-system interface is here intermediate layer in a layer-oriented operating system. It is not to be confused with a hardware abstraction layer (HAL), because an HAL is a layer between operating system and the hardware layer and serves for adjusting the operating system to different processor architectures. In contrast, the operating-system interface is a layer between the operating system and the primary application and serves for abstracting the operating system against the primary application.

In particular, the activation of the second operating system is realized by shifting memory address references in the operating-system interface. This has the advantage that there is introduced an abstracting interface between the system resources and the applications to be respectively executed on the security module and thus the respective operating system is uncoupled from all the applications on the security module. Thus, the primary application is independent of the operating system actually installed on the security module. Thus, a switchover between the first operating system and the second operating system can be effected without the calls of the primary application for system resources of the security module having to be adjusted.

In so doing, the first and second operating system, for example configured according to the standard ISO/IEC 7816-4, ETSI TS 102.221, ETSI TS 101.220, ETSI TS 102.241 or ETSI TS 102.226, continues to manage in principle the data processing and data transfer between the individual system resources of the security module, the data processing and data transfer from the security module to an end device being in data communication or from the end device to the security module, the sequential control of instruction commands, the management of the physical memory addresses of the memory area and/or the management and execution of the primary application. For this purpose, the operating system has for example an I/O manager, a command interpreter on its own, a return code manager, an operating system kernel, a resource manager for managing the hardware and the memory area, and/or an instruction set. Supporting information about an operating system of a security module can be found in chapter 13 of the "Handbuch der Chipkarten" by the authors Wolfgang Rankl & Wolfgang Effing in the 5th edition published by Hanser Verlag, to whose complete content reference is hereby made. The person skilled in the art will recognize that the term "operating system" employed herein also includes a firmware, because a firmware is by definition a proprietary operating system which is incorporated close to the hardware in the security module.

The first operating system differs from the second operating system for example in the version, i.e. an alternative development stage with alterations and further developments of at least parts of the operating system. Alternatively and/or additionally, the first operating system differs from the second operating system in the variant of the operating system, so that an alternative range of functions is present in the second operating system.

The shifting or switching over from the first to the second operating system is preferably effected within a few clock cycles of the security module.

For this purpose, the operating-system interface has a linking table, in which there are stored the memory address linkings between the primary application and the first operating system as well as the memory address linkings between the primary application and the second operating system. By means of a switchover command, triggered by an end device, a remote entity or the security module itself, there is effected a shift of the memory addresses to the second operating system. By using a linking table the shift is effected within a very short time, so that the operation of the security module can be resumed as fast as possible.

After the step of shifting there is effected a restart of the security module, in order to enable the security module to be operated with the second operating system. For this purpose, the operating-system interface sends for example a REFRESH command to an end device required for operation. Alternatively, on the end device side there is effected, with sending a shift command, the start of a predefined waiting time loop, upon the lapse of which the security module is restarted, a RESET is effected, or the operating voltage is switched off for a short time.

In a preferred embodiment of the invention, the incorporated primary application accesses the first operating system or the second operating system only via the operating-system interface. Further, the primary application is adapted to execute at least one secondary application, the secondary application being able to access the first operating system or the second operating system only by means of the primary application and the operating-system interface. Based on the method according to the invention, a second abstraction level is introduced herewith. This achieves a complete abstraction of the operating system from all the applications on the security module, thereby allowing a switchover to a completely alternative operating system without it being necessary to adjust one of the primary and/or secondary applications.

There is thus advantageously created a security module that is independent of the operating system, with an operating system for operating the security module being necessary still further but the exact embodiment, version and/or variant being irrelevant for the particular security module and the primary and/or secondary applications to be executed thereon.

In a preferred embodiment, the primary application is a virtual machine, in particular a Java Card Virtual Machine, JCVM for short. With this primary application it is possible to further abstract secondary applications on the security module and to execute these on different security module platforms. With security modules it is known that secondary applications, in particular programmed Java applications (applets, trustlets), a file system (MF, DF) with data in files (EF), security zones (security domains; SD), program libraries (API) only access the primary application and in particular not the operating system. If the primary application is a virtual machine, the operating-system interface can also be configured as an application programming interface, API for short, which implements the switchover from the addresses for the system resources management by the first operating system to the second operating system.

In an alternative embodiment, a virtual machine is part of the operating system and is replaced by a newer and/or improved version of the virtual machine within the framework of activating the second operating system. In this embodiment, additional primary applications can be incorporated on the security module. Secondary applications and the additional primary applications, if any, are abstracted by the operating-system interface and can be called in unchanged fashion after the activation of the second operating system.

In an embodiment, the primary application is a native service, for example a cryptoalgorithm, such as DES or AES algorithm or an alternative native program code, in which executable code is to be processed directly by the operating system. These primary applications now access only the operating-system interface which in turn accesses the respective operating system.

In a preferred embodiment, the second operating system is loaded into a memory area of the security module before the step of shifting. For loading the second operating system the security module is operational with the first operating system. The second operating system is loaded in particular via a data interface of the security module into the memory area. Thus, the second operating system can be equipped with the second operating system also at a time after the completion of the security module, i.e. in the field.

The second operating system is here loaded for example in the form of native code into a reserved memory area, e.g. into a dedicated EF. It is in principle relocatable, i.e. re-storing in a different memory area is possible. For this reason, at the time of loading the second operating system preferably has not yet fixed physical addresses, but merely relative addresses. According to the invention, the operating-system interface then shifts the addresses of the second operating system accordingly.

For this purpose, the security module is operational by means of an end device, in order to receive the second operating system. An end device for the purposes of the invention is in particular a device or a device component, which has means for the communication with a communications network, in order to receive the second operating system. For example, a mobile end device such as a smart phone, a tablet PC, a notebook, a PDA is included in this term. The end device can be understood to be for example also multimedia end devices such as digital picture frames, audio devices, TV sets, e-book readers, which also have means for the communication with a communications network. For example, the term end devices also comprises any type of machines, automatic machines, vehicles, arrangements, smart meters, which have means, in particular mobile radio modems, for communicating with the communications network. The second operating system can be transmitted to the end device in particular via an over-the-air interface, such as OTA, OTI and/or WLAN. Alternatively, the second operating system can be transmitted to the end device via a contact-type interface.

The loading into the security module is effected in particular via a loading unit, also referred to as a bootstrap loader or bootloader, of the security module. For this purpose, a secure memory area of the security module is chosen for storing the second operating system. The memory area in the security module is preferably reserved for the second operating system, so that an update of the security module can be effected without deleting user-specific data, if any. The second operating system is secured by means of an error detection code, a control sum, a check sum or EDC or with a digital signature. With them the second operating system is checked for data integrity. At the time of loading, the first operating system of the security module is activated.

The loading into the security module is alternatively effected via an application of the end device. At the time of loading, the first operating system of the security module is activated.

In a development of the invention, the second operating system is loaded into a memory area of the security module in encrypted form and first checked for plausibility there before the step of shifting or switching over. The plausibility check is effected in particular by means of checking an error detection code (=EDC or check sum), so that the transport and also the loading of the second operating system is effected in secured manner. The integration of malware and/or spy software into the second operating system is thus securely prevented. The decryption is effected by means of individual cryptographic keys incorporated in the security module. These keys are incorporated into the security module before the loading of the operating system, under authentication/identification of the security module.

After the decryption there is effected an analysis of the second operating system by the operating-system interface, in particular memory address linkings are stored in a linking table.

After the second operating system having been successfully shifted and activated the sending of a confirmation information to a remote entity is effected. Here, the second operating system is already employed using the operating-system interface. Thus, the remote entity is informed about which security module is operated with which operating system, to allow further updates to be possibly carried out later.

In an embodiment of the invention, the first operating system is deleted after the successful activation of the second operating system. This releases memory area in the security module, which can be employed for primary and/or secondary applications. Alternatively, the memory space remains reserved, in order to allow future operating systems to be reloaded.

In a preferred embodiment, the operating-system interface analyses, before the step of shifting, the first operating system for memory address references between the primary application and the first operating system. These analysed memory address references are stored in a linking table. This ensures that the operating-system interface can relink all the memory addresses of the first operating system to memory addresses of the second operating system.

According to the invention, there is also provided a security module having a central processing unit, a memory area and a data interface, in the memory area there being stored a first operating system and at least one primary application and the security module being operational with the first operating system. The security module has an operating-system interface with direct access to the first operating system. The primary application accesses the first operating system indirectly via the operating-system interface.

Preferably, the security module has a second operating system in the memory area, the operating-system interface accessing the second operating system directly. The security module additionally has a shifter for shifting or switching over between the first operating system and the second operating system, the primary application remaining unchanged.

Within the basic inventive concept there is further the employment of a security module in an end device, the second operating system being made available by a remote entity via a mobile communications network.

A communications network for the purposes of the present invention is a technical arrangement on which there takes place the transfer of signals under identification and/or authentication of the communication participant, thereby services being offered. In particular, in this invention a mobile radio network is understood to mean for example the "Global System for Mobile Communications", GSM for short, as representative of the second generation, or the "General Packet Radio Service", GPRS for short, or "Universal Mobile Telecommunications System", UMTS for short, as representatives of the third generation, or the "Long Term Evolution", LTE for short, as representative of the fourth generation.

BRIEF DESCRIPTION OF THE DRAWINGS

Hereinafter the invention or further embodiments and advantages of the invention will be explained more closely on the basis of Figures, the Figures merely describing embodiment examples of the invention. Identical components in the Figures are provided with identical reference signs. The Figures are not to be considered true to scale, individual elements of the Figures may be represented with exaggerated size or exaggerated simplicity.

There are shown:

FIG. 1 A block diagram of a security module according to the prior art

FIG. 2 A representation of the layer-oriented software structure of a security module FIG. 3 A simplified representation of a memory area of a security module according to the invention having two operating systems and one operating-system interface FIG. 4 A linking table according to the invention within the security module FIG. 5 A detailed layer representation of a security module according to the invention having two operating systems and the operating-system interface FIG. 6 A method flowchart according to the invention

DETAILED DESCRIPTION OF VARIOUS EMBODIMENTS

Figure 5:
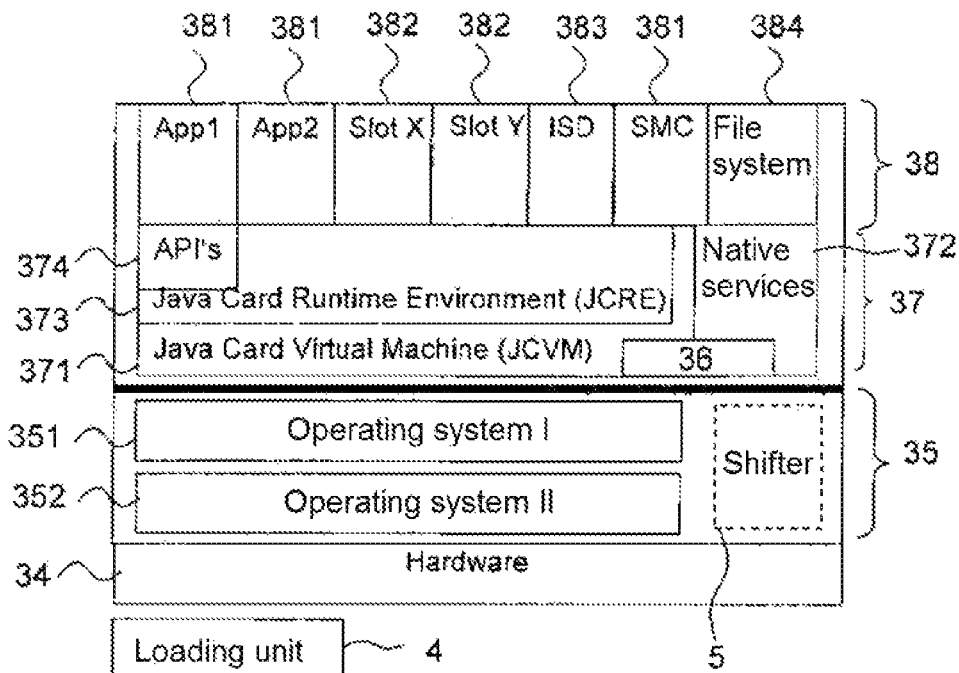

FIG. 1 shows a block diagram of a security module 3 according to the prior art. The security module 3 has various system resources, for example a data interface 31 for data input and data output. The data interface 31 is for example a near-field communication interface according to one of ISO/IEC 14443, ISO/IEC 15693, ISO/IEC 18092 or Bluetooth according to IEEE 802.15.1 or a direct local radio network, WLAN for short, according to IEEE 802.11 or an infrared transmission or wireless USB according to ISO/IEC 26907 or a single wire protocol interface. Alternatively and/or additionally, the data interface 31 is configured in a contact-type fashion, for example by means of ISO/IEC 7816, USB, Firewire, MMC, SD specification etc.

A memory area 33 as a further system resource with a volatile memory area RAM, a permanent-non-volatile memory area ROM as well as a semipermanent-non-volatile memory area EEPROM or FLASH is also provided in the security module 3. According to prior art at least one operating system 35 is stored in the ROM, according to the prior art cited in the introduction a first operating system 351 as well as a second operating system 352 are incorporated in the ROM memory area 33 here.

For the execution of the operating system 35, a central processing unit 32 is provided as a further system resource in the security module 3. It has direct access both to the data interface 31 and to the memory area 33.

In FIG. 2 there is represented the layer-oriented software structure of a security module 3. The lowest layer represents the hardware layer 34. The operating system 35 directly accesses this hardware layer 34 via memory address linkings. In some cases, between hardware layer 34 and operating system 35 there can be incorporated also a hardware abstraction layer (HAL) (not shown), which is not to be confused, as mentioned in the introduction, with the operating-system interface 36 of the invention.

In the security module 3 there is incorporated a primary application 37, here in the form a Java Card Virtual Machine (JCVM) 371. The JCVM in turn makes available a runtime environment JCRE 373. Also program code libraries 374, here drawn as part of the primary application 37, are shown as part of the primary application 37. Alternatively to a JCVM 371 as a primary application, a native service 372 is incorporated as a primary application 37 into the security module 3. These primary applications 37 access the operating system 35 directly—according to the prior art—via memory address references 41, here represented by the arrows 41.

The security module 3 moreover has secondary applications 38 which access the primary applications 37. The secondary applications 38 do not access the operating system 35, thereby allowing the secondary applications 38 to be kept very abstract. As secondary applications 38 there are here represented by way of example Java applications 381 or a file system 384, which access the respective primary application 37 according to memory address references 40.

In FIG. 3 there is shown a simplified representation of a memory area 33 of a security module 3 of the invention. Here, the relation between secondary application 38 and primary application 37 of FIG. 2 is represented anew. By means of memory address references 40 a secondary application 38 accesses the primary application 37. According to the invention, the primary application 37 now does not directly access the operating system 35, but the primary application 37 accesses an operating-system interface 36 by means of memory address references 41. Only the operating-system interface 36 accesses the activated operating system 35. The operating-system interface 36 accesses the first operating system 351 by means of a memory address table 42. In the represented preferred embodiment, the operating-system interface 36 further already has memory address references 42 to the second operating system 352, so that in this shown case there is already possible a shift from the first operating system 351 to the second operating system 352.

There are further represented a bootloader 4 as well as a free memory 39 which is also referred to as a Java heap.

The second operating system 352 has here been reloaded into a reserved part of the memory 33 of the security module 3 by means of the loading unit 4 during the operation of the security module 3. In so doing, a check sum was checked, to allow manipulations of the second operating system 352 to be excluded.

For example, the second operating system 352 comprises an alternative range of functions, an alternative instruction set, an improved command interpreter compared to the first operating system 351. For example, the version of the first operating system 351 is outdated, so that it is to be replaced by a newer version 352. Alternatively, the second operating system is merely an alternative variant with changed ranges of functions, an alternative data management or the like, to make possible alternative functions for the security module.

In FIG. 4 there is represented in more detail a linking table 42 which is employed by the operating-system interface 36. Only as an example, there are represented the links for the operating system commands 44 "write", "read" and "open". All the commands of the primary application 37 which are received from the operating system 35 are resolved in this table 42 into physical memory addresses.

It can be recognized that for the first operating system 351 there apply address references 42 that are different from those for the second operating system 352, because the second operating system 352 and all the corresponding contents are stored in different parts of the memory area 33 than the contents of the first operating system 351. The operating-system interface 36 thus analyses the primary application 37 with regard to address references 41 to the first operating system 351 and replaces these according to the linking table 42 upon the shifting or switching over to the second operating system 352. The shifting can be effected all at once on the basis of a shift command 6, so that the security module is again operational with the second operating system 352 within a few clock cycles.

In FIG. 5 there is represented a representation of the layer-oriented software structure of a security module according to the invention with two operating systems and an operating-system interface. The hardware layer 34 as the lowest layer is operated by the operating system layer 35. Here, there are represented, according to the invention, a first operating system 351 and a second operating system 352. A shifter 5 serves for shifting the security module 3 from the first operating system 351 to the second operating system 352. For this purpose, for example the method of the linking table 42, described in FIGS. 3 and 4, is applied. Above the operating system level 35 there is incorporated the operating-system interface 36, which forms the interface between the primary applications 37 and the respective operating system 35. As primary application 37 there is provided e.g. a JCVM 371 with JCRE 373 and APIs 374. Alternatively or additionally, as primary application 37 there is provided a native service. As secondary applications 38 there are provided applets 381, for example payment application, authentication application, subscriber identity data switchover application (SMC). Furthermore, there can be provided a security zone 383 or a file system 384 in the security module 3. Furthermore, there can be provided subscriber identity data 382. Subscriber identity data 382, on the one hand, are data which uniquely identify a subscriber in a communications network (for example in a mobile radio network), for example an International Mobile Subscriber Identity (IMSI) and/or subscriber-specific data. On the other hand, the subscriber identity data can be data which uniquely authenticate a subscriber vis-à-vis the communications network, for example an authentication algorithm, specific algorithm parameter, a cryptographic authentication key or a cryptographic over-the-air (OTA) key.

Figure 6:
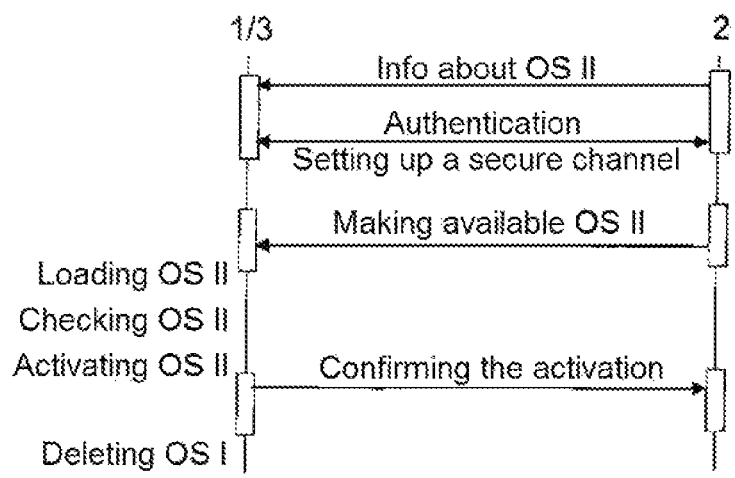

In FIG. 6, there is represented a flowchart of the method according to the invention for activating an operating system 35 in the security module 3. Here, the security module 3 is in communication with a remote entity 2 via an end device 1. During the operation of the security module 3 in the first operating system 351, the remote entity 2, in particular a mobile radio server, informs about a more recent version of the operating system 35 on the security module 3, hereinafter referred to as the second operating system 352. The security module 3 or the end device 1 requests the second operating system 352 from the remote entity 2. For this purpose, a secure channel is set up under authentication/identification of the security module 3. The channel is preferably a communication channel between the end device 1 and the server 2, for example a communication channel configured according to the Bearer Independent Protocol, BIP for short, via a mobile radio network or an SMS channel according to the GSM specification GSM 11.48. Alternative communication channels, for example WLAN, NFC are also possible. The communication can be set up over-the-air or over-the-internet or by direct connection to a terminal.

After the successful authentication of the end device 1 or of the security module 3, the server 2 makes available the second operating system 352 to be downloaded, in encrypted form with a check sum for the plausibility check. The security module loads the second operating system 352 into the memory area 33, checks the plausibility with the help of the check sum, decrypts the second operating system and analyses it with regard to the address linkings 41. Subsequently, it is activated by the switchover command 6. The switchover can be initiated in particular by the server 2, for example by means of a shift command 6. After a restart of the security module 3 a function test is carried out, in the case of a successful passing a confirmation information being sent to the remote entity 2. Subsequently, the first operating system 351 is deleted from the memory area.

In an embodiment not shown by a figure, the JCVM 371 with JCRE 372 is a part of the operating system 35. In this embodiment, the JCVM 371 is kept in the level of the operating system 35 and is part of the first operating system 351. The second operating system 352 then likewise has a JCVM 371 with JCRE 373. The APIs 374 as well as the secondary applications 38 remain unchanged in the security module 3 upon the shifting 6 to the second operating system 352. The operating-system interface 36 abstracts the operating system 35 and also shifts the corresponding linkings regarding the virtual machine. The JCVM 371 in this case is no primary application 37.

The invention claimed is:

1. A method for activating an operating system in a security module, wherein the security module is operational either by means of a first operating system or by means of a second operating system, having the method steps:
   operating the security module by means of the first operating system and shifting the security module from the first operating system to the second operating system;
   wherein:
   a primary application incorporated in the security module accesses the respective operating system by means of an operating-system interface, so that the incorporated primary application remains unchanged by the step of shifting, wherein the incorporated primary application accesses the first operating system or the second operating system only via the operating-system interface; and the primary application is adapted to execute at least one secondary application, wherein the secondary application can access the first operating system or the second operating system only by means of the primary application and the operating-system interface.

2. The method according to claim 1, wherein the primary application is a virtual machine and/or a native service.

3. The method according to claim 1, wherein a virtual machine is part of the first operating system as well as of the second operating system.

4. The method according to claim 1, wherein activating the second operating system is realized by shifting memory address references in the operating-system interface.

5. The method according to claim 1, wherein the second operating system is loaded into a memory area of the security module before the step of shifting.

6. The method according to claim 1, wherein the operating-system interface analyses, before the step of shifting, the first operating system for memory address references between the primary application and the first operating system and stores these memory address references in a memory address table.

7. The method according to claim 1, wherein the second operating system is loaded into a memory area of the security module in encrypted form and checked for plausibility before the step of shifting.

8. The method according to claim 1, wherein a confirmation information is sent to a remote entity after the step of shifting.

9. The method according to claim 1, wherein the first operating system is deleted after the step of shifting to the second operating system.

* * * * *